United States Patent [19]

Loev

[11] 3,856,821

[45] Dec. 24, 1974

[54] ALKOXY DIBENZO (b,d) PYRANS

[75] Inventor: Bernard Loev, Broomall, Pa.

[73] Assignee: Smith Kline Corporation, Philadelphia, Pa.

[22] Filed: July 18, 1973

[21] Appl. No.: 380,434

[52] U.S. Cl............................. 260/345.3, 424/283
[51] Int. Cl............................................ C07d 7/20
[58] Field of Search................................ 260/345.3

[56] References Cited
UNITED STATES PATENTS
3,728,360   4/1973   Pars et al......................... 260/345.3

Primary Examiner—John M. Ford
Attorney, Agent, or Firm—Joan S. Keps; Richard D. Foggio; William H. Edgerton

[57] ABSTRACT

The compounds of this invention are alkoxy dibenzo[b,d]pyrans having pharmacological activity such as central nervous system activity, anti-arthritic and anti-inflammatory activity. A preferred compound is 1-hydroxy-7,8,9,10-tetrahydro-3-(1-methylhexyloxy)-6,6,9-trimethyl-6H-dibenzo[b,d]pyran.

5 Claims, No Drawings

ALKOXY DIBENZO (B,D) PYRANS

This invention relates to new alkoxy dibenzo[b,d]pyrans which have pharmacological activity.

The compounds of this invention are represented by the following structural formula:

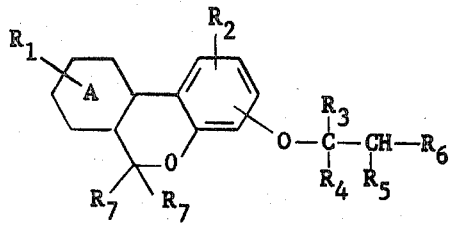

FORMULA I in which:
ring A is a benzene ring, a cyclohexane ring or a cyclohexene ring with the double bond being at position 6a-10a, 8 or 9;
$R_1$ is hydrogen, methyl or ethyl;
$R_2$ is hydrogen or $OR'$ where $R'$ is hydrogen or alkanoyl of from two to five carbon atoms;
$R_3$ is hydrogen, methyl or ethyl and $R_4$ and $R_5$ are hydrogen or methyl, at least one of $R_3$, $R_4$ and $R_5$ being other than hydrogen;
$R_6$ is alkyl of from four to eight carbon atoms; and
$R_7$ is methyl or ethyl.

In the nomenclature used herein the dibenzo[b,d]pyran ring is numbered as follows:

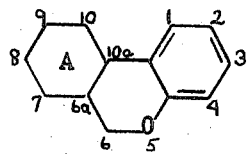

Preferred compounds of this invention are represented by Formula I where $R_2$ is in the 1-position and

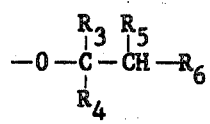

is in the 3-position. Most preferred are compounds of Formula I in which ring A is a cyclohexene ring with the double bond at position 6a-10a, $R_2$ is in the 1-position,

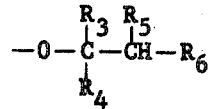

is in the 3-position, $R_3$ is methyl and $R_4$ and $R_5$ are hydrogen or methyl.

Advantageous compounds of this invention are represented by Formula I in which ring A is a cyclohexene ring with the double bond at position 6a-10a, $R_1$ is methyl in the 9-position, $R_2$ is hydroxy or acetoxy in the 1-position,

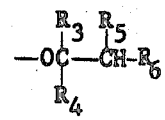

is in the 3-position, $R_3$ and $R_7$ are methyl, $R_4$ and $R_5$ are hydrogen and $R_6$ is n-butyl.

Particularly preferred is the compound 1-hydroxy-7,8,9,10-tetrahydro-3-(1-methylhexyloxy)-6,6,9-trimethyl-6-H-dibenzo[b,d]pyran. This compound is represented by the following structural formula:

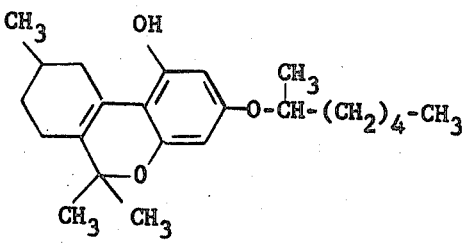

FORMULA II

The compounds of this invention may exist as optical isomers due to the asymmetry of carbon atoms in the side chain and in ring A. All of the isomers, including separated isomers and mixtures thereof, are included within the scope of this invention.

The compounds of Formula I in which ring A is a cyclohexene ring with the double bond at position 6a-10a and $R_2$ is hydrogen or hydroxy are prepared by condensation of a 2-carbalkoxycyclohexanone, for example 2-carbethoxycyclohexanone, with a di or trihydroxybenzene monoalkyl ether followed by treatment of the intermediate alkoxy-7,8,9,10-tetrahydro-6H-dibenzo[h,d]pyrone with a methyl or ethyl magnesium halide and subsequent cyclization to the alkoxy -7,8,9,10-tetrahydro -6H-dibenzo [b,d]pyran by addition of the reaction mixture to an acid solution, for example hydrochloric acid.

The compounds of Formula I in which ring A is a cyclohexene ring having the double bond at the 8-position and $R_2$ is hydrogen or hydroxy are prepared by condensing verbenol or an analog thereof with a di or trihydroxybenzene monoalkyl ether in the presence of acid such as p-toluenesulfonic acid or boron trifluoride etherate, followed by treatment of the resulting adduct with boron trifluoride etherate by the procedure of Mechoulam et al. [*Arzneim.-Forsch* 22:1995 (1972)] as shown in the following scheme:

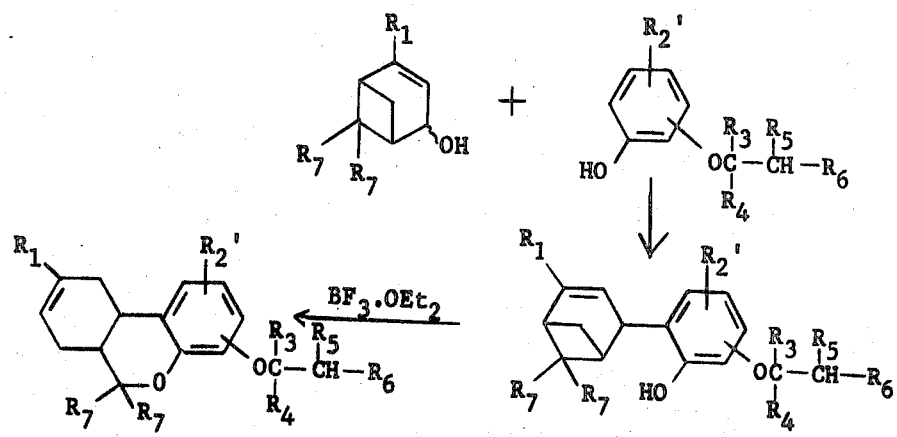

The terms $R_1$, $R_3$, $R_4$, $R_5$, $R_6$ and $R_7$ are defined as described above and $R_2'$ is hydrogen or hydroxy.

The compounds of Formula I in which ring A is a cyclohexene ring with the double bond at the 9-position and $R_2$ is hydrogen or hydroxy are prepared by isomerization of the corresponding compounds of Formula I with the cyclohexene double bond at the 8-position with zinc chloride and hydrogen chloride followed by treatment with base [Mechoulam, et al., *Arzneim.-Forsch.* 22:1995 (1972) and Petrzilka, et al., *Helv. Chim. Acta* 52:1102 (1969)].

Other procedures which may be applied to prepare these compounds are described by Fahrenholtz, et al., *J. Amer. Chem. Soc.* 89:5934 (1967), Mechoulam, et al., *J. Amer. Chem. Soc.* 89:4552 (1967) and Razdan, et al., *J. Amer. Chem. Soc.* 92:6061 (1970) and in U.S. Pat. No. 3,388,136.

The compounds of Formula I in which ring A is a benzene ring and $R_2$ is hydrogen or hydroxy are prepared by dehydrogenation of the corresponding compounds of Formula I in which ring A is a cyclohexene ring. The dehydrogenation is carried out either using a catalyst such as palladium on carbon or using a chemical dehydrogenating agent such as 2,3-dichloro-5,6-dicyanoquinone.

The compounds of Formula I in which ring A is a cyclohexane ring and $R_2$ is hydrogen or hydroxy are prepared from the corresponding compounds of Formula I where ring A is a cyclohexene ring by chemical or catalytic reduction according to standard proceduress such as with palladium on carbon in ethanol.

The compounds of this invention may also be prepared by reaction of the hydroxy-6H-dibenzo[b,d]pyrans or hydroxy-6H-dibenzo[b,d]pyrones with the appropriate alkyl halide followed by separation of the isomeric monoalkyl ethers by standard methods, for example by column chromatography with subsequent conversion of the alkoxy-6H-dibenzo[b,d]pyrones to alkoxy-6H-dibenzo[b,d]-pyrans as previously described.

The alkoxyphenolic starting materials are prepared by reaction of a di or trihydroxybenzene and an appropriate haloalkane in the presence of base.

The compounds of Formula I in which R' is lower alkanoyl are prepared from the corresponding compounds of Formula I where R' is hydrogen by conventional methods, for example, by reaction of the hydroxy compound with a lower alkanoic acid anhydride or a lower alkanoyl halide.

Several 3-n-alkoxy-tetrahydro-6H-dibenzo[b,d]-pyrans have been prepared and found to produce no activity or "feeble activity" in the Gayer corneal reflex test upon administration to rabbits in doses up to 20 mg./kg. i.v. [Bergel, et al., *J. Chem. Soc.* 286 (1943)]. This is a known test for the central nervous system depressant effects of cannabinol compounds.

Surprisingly, the compounds of this invention showed substantial central nervous system depressant activity at doses of from about 5 to 50 mg./kg. In particular, the compund of Formula II showed a ten-fold increase in potency over the 3-n-hexyl analog in the rat.

The compounds of this invention have pharmacological activity such as central nervous system depressant, sedative and tranquilizing activity, antiarthritic and anti-inflammatory activity. In addition, these compounds may have hypotensive, anti-convulsive, anti-migraine, analgesic and diuretic activity.

The central nervous system activity is demonstrated by oral administration to rats at doses of about 5 to 50 mg./kg. to produce effectss such as decreased spontaneous motor activity. The compound of Formula II showed activity at 5 mg./kg.

The anti-arthritic activity is measured by the ability of the test compound to inhibit adjuvant-induced polyarthritis in rats at daily oral doses of about 50 mg./kg. Adjuvant arthritis in rats is produced by a single injection of 0.75 mg. of *Mycobacterium butyricum* suspended in white paraffin oil (N.F.) into a hind paw (left footpad). The injected paw becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. A dose of 3.6 mg./kg. of the compound of Formula II administered on the day of adjuvant injection and continuing for 17 days thereafter, exclusive of days 4, 5, 11 and 12, protects the animals against development of both primary and secondary lesions of adjuvant arthritis.

One skilled in the art will recognize that in determining the amounts of the compounds to produce the desired pharmacological effect, the activity of the compound as well as the size of the host animal must be considered.

The compounds of this invention may be combined with standard pharmaceutical carriers and administered internally in conventional dosage forms such as capsules, tablets or liquid preparations.

The following examples illustrate the invention but are not to be construed as limiting the scope thereof. Temperatures are in degrees Centigrade unless otherwise stated.

EXAMPLE 1

1-Hydroxy-7,8,9,10-tetrahydro-3-(1-methylhexyloxy)-6,6,9-trimethyl-6H-dibenzo[b,d]pyran To a stirred solution of 126 g. (1.0 mol.) of phloroglucinol and 19.0 g. (0.34 mol.) of potassium hydroxide in dimethylformamide was added 186 g. (1.04 mol.) of 2-bromoheptane. After heating the mixture for 16 hours at 100°, 250 ml. of acetic acid was added and the mixture was filtered. The filtrate was concentrated, dissolved in ether, washed with water and extracted with 10% aqueous sodium hydroxide. The alkaline solution was washed with ether, acidified with dilute hydrochloric acid and extracted with ether. The organic phase was dried (MgSO$_4$), treated with charcoal and filtered. The solvent was evaporated and the residue wazs distilled to give 5-(1-methylhexyloxy)resorcinol as a resin, b.p. 165°–170° (0.15 mm.).

To a stirred solution of 11.2 g. (0.05 mol.) of 5-(1-methylhexyloxy)resorcinol and 8.8 g. (0.05 mol.) of 5-methyl-2-carbethoxycyclohexanone in 50 ml. of benzene was added 7.7 g. (0.050 mol.) of phosphorus oxychloride. After 2 hours, the solution was refluxed for 15 minutes, then allowed to stir at 25° for 24 hours. The reaction mixture was treated with water, refluxed for 15 minutes and ethyl acetate was added. The organic phase was washed with 5% aqueous sodium bicarbonate, water and saturated sodium chloride solution, dried (MgSO$_4$) and concentrated to give 1-hydroxy-7,8,9,10-tetrahydro-3-(1-methylhexyloxy)-9-methyl- 6H-dibenzo[b,d]pyrone, m.p. 161°–163° (nitromethane).

A solution of 2.9 g. (8.8 mmol.) of the dibenzo[b,d]pyrone in 100 ml. of anhydrous tetrahydrofuran was added with stirring under nitrogen to a solution of 50 mmol. of methyl magnesium bromide in 25 ml. of benzenetetrahydrofuran. After refluxing for 24 hours and stirring at 25° for 72 hours, the solution was poured onto a mixture of dilute hydrochloric acid-ice and extracted with ether. The organic phase was washed with water, 5% aqueous sodium bicarbonate, water and saturated sodium chloride solution and dried (MgSO$_4$). The solvent was evaporated and the residue was dissolved in 100 ml. of benzene and 20 ml. of ether saturated with hydrogen chloride was added. After refluxing the solution for 2 hours, the solvent was evaporated in vacuo and the residue was distilled to give the title compound, b.p. 224°–228° (0.1 mm.).

EXAMPLE 2

7,8,9,10-Tetrahydro3-(1-methylhexyloxy)-6,6,9-trimethyl-6H-dibenzo[b,d]pyran

Substitution of an equivalent amount of resorcinol in the procedure of Example 1 for phloroglucinol gives 3-(1-methylhexyloxy)phenol.

To a cooled (−5°) mixture of 8.5 g. (0.041 mol.) of 3-(1-methylhexyloxy)phenol and 7.5 g. (0.041 mol.) of 5-methyl-2-carbethoxycyclohexanone is added 35 ml. of precooled (0°) concentrated sulfuric acid in such manner that the temperature does not rise above 5° during addition. The reaction mixture is stirred at 0° for 15 minutes, then it is warmed to room temperature and stirred for 1.5 hours after which time it is poured into 300 ml. of ice-water. The aqueous mixture is extracted with ethyl acetate and the extracts are washed with water and saturated sodium chloride solution, dried (MgSO$_4$) and concentrated in vacuo to give 7,8,9,10-tetrahydro-3-(1-methylhexyloxy)-9-methyl-6H-dibenzo[b,d]pyrone.

Treatment of 7,8,9,10-tetrahydro-3-(1-methylhexyloxy)-9-methyl-6H-dibenzo[b,d]pyrone with methyl magnesium bromide and subsequent cyclization according to the procedure of Example 1 gives 7,8,9,10-tetrahydro-3-(1-methylhexyloxy)-6,6,9-trimethyl-6H-dibenzo[b,d]pyran.

EXAMPLE 3

3-(1,2-Dimethylhexyloxy)-1-hydroxy-7,8,9,10-tetrahydro-6,6,9-trimethyl-6H-dibenzo[b,d]pyran 3Methyl-2-heptanol [*Bull. Soc. Chim. Fr.* 3704 (1970)] (130 g.; 1.0 mol.) is cooled to −5° and 298 g. (1.0 mol.) of phosphorus tribromide is added dropwise with stirring while maintaining the temperature lower than 5°. The reaction mixture is stirred for 4 hours at 0° then heated at 60° for 1 hour. After cooling, 300 ml. of ice-water is slowly added and the layers are separated. The aqueous phase is extracted twice with benzene and the combined organic layers are washed with cold concentrated sulfuric acid, ice-water, cold 10% aqueous sodium bicarbonate and saturated aqueous sodium chloride and dried (MgSO$_4$). The solvent is evaporated and the rsidue distilled in vacuo to give 2-bromo-3-methylheptane.

When an equivalent amount of 2-bromo-3-methylheptane is substituted in the procedure of Example 1 for 2-bromoheptane, 5-(1,2-dimethylhexyloxy)-resorcinol is obtained.

Reaction of 5-(1,2-dimethylhexyloxy)resorcinol with 5-methyl-2-carbethoxycyclohexanone followed by treatment with methyl magnesium bromide and subsequent cyclization as described in Example 1 gives the title compound.

EXAMPLE 4

1-Hydroxy-7,8,9,10-tetrahydro-3-(1,1,2-trimethylhexyloxy)-6,6,9-trimethyl-6H-dibenzo[b,d]pyran Substitution of an equivalent amount of 2,3-dimethyl-2-heptanol [*J. Gen. Chem. USSR* 18:1328 (1948)] in the procedure of Example 3 for 3-methyl-2-heptanol gives 2-bromo-2,3-dimethylheptane.

When an equivalent amount of 2-bromo-2,3-dimethylheptane is substituted in the procedure of Example 1 for 2-bromoheptane, 5-(1,1,2-trimethylhexyloxy)resorcinol is obtained.

Substitution of an equivalent amount of 5-(1,1,2trimethylhexyloxy)resorcinol in the procedure of Example 1 for 5-(1-methylhexyloxy)resorcinol gives the title compound.

EXAMPLE 5

1-Hydroxy-3-(1-ethyl-2-methylhexyloxy)-7,8,9,10-tetrahydro-6,6,9-trimethyl-6H-dibenzo[b,d]pyran Substitution of an equivalent amount of 3-bromo-4-methyloctane [*J. Amer. Chem. Soc.* 56:1167 (1934)] in the procedure of Example 1 for 2-bromoheptane gives 5-(1-ethyl-2-methylhexyloxy)resorcinol.

Condensation of equivalent amounts of 5-(1-ethyl-2-methylhexyloxy)resorcinol and 5-methyl-2-carbethoxycyclohexanone followed by treatment with methyl magnesium bromide and subsequent cyclization according to the procedure of Example 1 gives the title compound.

EXAMPLE 6

1-Hydroxy-7,8,9,10-tetrahydro-3-(1-methyloctyloxy)-6,6,9-trimethyl-6H-dibenzo[b,d]pyran 5-(1-Methyloctyloxy)resorcinol is prepared by substitution of an equivalent amount of 2-bromononane in the procedure of Example 1 for 2-bromoheptane.

When an equivalent amount of 5-(1-methyloctyloxy)resorcinol is condensed with 5-methyl-2-carbethoxycyclohexanone followed by treatment with methyl magnesium bromide and subsequent cyclization as described in Example 1, the title compound is obtained.

EXAMPLE 7

1-Hydroxy-7,8,9,10-tetrahydro-3-(1-methyldecyloxy)-6,6,9-trimethyl-6H-dibenzo[b,d]pyran When an equivalent amount of 2-bromoundecane is substituted in the procedure of Example 1 for 2-bromoheptane, 5-(1-methyldecyloxy)resorcinol is obtained.

Condensation of equivalent amounts of 5-(1-methyldecyloxy)resorcinol and 5-methyl-2-carbethoxycyclohexanone followed by treatment with methyl magnesium bromide and subsequent cyclization according to the procedure of Example 1 gives the title compound.

EXAMPLE 8

3(-1-Ethylhexyloxy)-1-hydroxy-7,8,9,10-tetrahydro-6,6,9-trimethyl-6H-dienzo[b,d]pyran Substitution of an equivalent amount of 3bromooctane in the procedure of Example 1 for 2-bromoheptane gives 5-(1-ethylhexyloxy)resorcinol.

When an equivalent amount of 5-(1-ethylhexyloxy)-resorcinol is condensed with 5-methyl-2-carbethoxycyclohexanone followed by reaction with methyl magnesium bromide and subsequent cyclization as described in Example 1, the title compound is obtained.

EXAMPLE 9

1-Hydroxy-6a,7,10,10a-tetrahydro-3-(1-methylhexyloxy)-6,6,9-trimethyl-6H-dibenzo[b,d]pyran To a stirred solution of 0.23 g. (1.4 mmol.) of dry p-toluenesulfonic acid and 2.24 g. (10 mmol.) of 5-(1-methylhexyloxy)resorcinol in 500 of chloroform is added a solution of 1.9 g. (13.5 mmol.) of cis-verbenol [J. Chem. Soc. 2864 (1960)] in 200 ml. of chloroform over a 50 minute interval. The reaction mixture is stirred for 30 minutes, then ether and water are added and the layers are separated. The organic phase is washed with 5% aqueous sodium bicarbonate, dried (MgSO$_4$) and concentrated in vacuo. The residue is chromatographed on Florisil and eluted with 5% ether-petroleum ether to give 2,6-dihydroxy-4-(1-methylhexyloxy)-1-verbenylbenzene which is dissolved in 100 ml. of methylene chloride containing 1 ml. of boron trifluoride etherate. After 30 minutes ether and water are added and the layers are separated. The aqueous phase is extracted twice with ether and the combined extracts are washed with 5% aqueous sodium bicarbonate, dried (MgSO$_4$) and concentrated in vacuo. Chromatography of the residue on Florisil and elution with 2% ether-petroleum ether gives the title compound.

EXAMPLE 10

1-Hydroxy-6a,7,8,10a-tetrahydro-3-(1-methylhexyloxy)-6,6,9-trimethyl-6H-dibenzo[b,d]pyran Dry hydrogen chloride gas is bubbled into a solution of 4.7 g. (13 mmol.) of 1-hydroxy-6a, 7,10,10a-tetrahydro-3-(1-methylhexyloxy)-6,6,9-trimethyl-6H-dibenzo-[b,d]pyran in 250 ml. of dry toluene containing 0.5 g. (3.7 mmol.) of anhydrous zinc chloride at −5° to −15° for 6 hours. The reaction mixture is filtered and the filtrate is washed with water until neutral, dried (MgSO$_4$) and concentrated in vacuo at 25°. The residue is dried for 12 hours at 25° under vacuum to give 9-chloro-1-hydroxy-6a,7,8,10,10a-pentahydrol-3-(1-methylhexyloxy)-6,6,9-trimethyl-6H-dibenzo[b,d]pyran.

To a 1M solution of potassium t-amylate in 10 ml. of benzene under an argon atmosphere at 5° is added dropwise with stirring a solution of 3.1 mmol. of the 9-chloro-6H-dibenzo[b,d]pyran in 15 ml. of dry benzene. The reaction mixture is heated to 65° for 15 minutes, then it is cooled in an ice bath and bubbled with carbon dioxide for 30 minutes. Ether and ice water are added and the mixture is neutralized with 5% aqueous sodium bicarbonate. The layers are separated and the organic phase is dried (MgSO$_4$) and concentrated in vacuo to give the title compound.

EXAMPLE 11

1-Hydroxy-3-(1-methylhexyloxy)-6,6,9-trimethyl-6H-dibenzo[b,d]pyran

A solution of 2.0 g. of 1-hydroxy-7,8,9,10-tetrahydro-3-(1-methylhexyloxy)-6,6,9-trimethyl-6H-dibenzo[b,d]pyran in 70 ml. of dry p-cymene is added dropwise at reflux to a well stirred suspension of 660 mg. of 10% palladium on carbon in 70 ml. of dry p-cymene, which is bubbled continuously with nitrogen. The addition is made over 45 minutes. Refluxing is continued for an additional hour, and the mixture is then cooled, chloroform is added and the catalyst is filtered off. The chloroform solution is evaporated in vacuo and the residue is chromatographed on a silica gel dry column. The fractions are eluted and distilled to give the title compound.

In like manner, the title compound may be obtained from 1-hydroxy-6a,7,8,10a-tetrahydro-3(1-methylhexyloxy)-6,6,9-trimethyl-6H-dibenzo[b,d]pyran or from 1-hydroxy-6a,7,10,10a-tetrahydro-3-(1-methylhexyloxy)-6,6,9-trimethyl-6H-dibenzo[b,d]pyran.

EXAMPLE 12

1-Hydroxy-6a,7,8,9,10,10a-hexahydro-3-(1-methylhexyloxy)-6,6,9-trimethyl-6H-dibenzo[b,d]pyran A mixture of 2.9 g. (8.1 mmol.) of 1-hydroxy-7,8,9,10-tetrahydro-3-(1-methylhexyloxy)-6,6,9-trimethyl-6H-dibenzo[b,d]pyran in 100 ml. of absolute ethanol and 10% palladium on carbon is hydrogenated at 48 p.s.i. and 25° until 8 mmol. of hydrogen is absorbed. After addition of a small amount of chloroform the mixture is filtered, the solvent is evaporated and the residue is distilled to give the title compound.

In like manner, the title compound may be obtained from 1-hydroxy-6a,7,8,10a-tetrahydro-3-(1-methylhexyloxy)-6,6,9-trimethyl-6H-dibenzo[b,d]pyran or from 1-hydroxy-6a,7,10,10a-tetrahydro-3-(1-methylhexyloxy)-6,6,9-trimethyl-6H-dibenzo[b,d]pyran.

EXAMPLE 13

2-Hydroxy-7,8,9,10-tetrahydro-3-(1-methylhexyloxy)-6,6,9-trimethyl-6H-dibenzo[b,d]pyran,
2-hydroxy-7,8,9,10-tetrahydro-1-(1-methylhexyloxy)-6,6,9-trimethyl-6H-dibenzo[b,d]pyran and
2-hydroxy-7,8,9,10-tetrahydro-4-(1-methylhexyloxy)-6,6,9-trimethyl-6H-dibenzo[b,d]pyran Substitution of an equivalent amount of 1,2,4-trihydroxybenzene in the procedure of Example 1 for phloroglucinol gives a mixture of 4-(1-methylhexyloxy)-catechol,2-(1-methylhexyloxy)hydroquinone and 4-(1-methylhexyloxy)resorcinol. The mixture is separated by wet or dry column chromatography or silica.

Reaction of equivalent amounts of 2-(1-methylhexyloxy)hydroquinone and 5-methyl-2-carbethoxycyclohexanone followed by treatment with methyl magnesium bromide and subsequent cyclization according to the procedure described in Example 1 gives a mixture of the title compounds which is separated by dry column chromatography on silica.

EXAMPLE 14

4-Hydroxy-7,8,9,10-tetrahydro-2-(1-methylhexyloxy)-6,6,9-trimethyl-6H-dibenzo[b,d]pyran and 4-hydroxy-7,8,9,10-tetrahydro-1-(1-methylhexyloxy)-6,6,9-trimethyl-6H-dibenzo[b,d]pyran Condensation of equivalent amounts of 4-(1-methylhexyloxy)catechol and 5-methyl-2-carbethoxycyclohexanone followed by treatment with methyl magnesium bromide and subsequent cyclization as described in the procedure of Example 1 gives a mixture of the title compounds. The mixture is separated by dry column chromatography on silica.

EXAMPLE 15

3Hydroxy-7,8,9,10-tetrahydro-2-(1-methylhexyloxy)-6,6,9-trimethyl-6H-dibenzo[b,d]pyran, 1-hydroxy-7,8,9,10-tetrahydro-2-(1-methylhexyloxy)-6,6,9-trimethyl-6H-dibenzo[b,d]pyran and 1-hydroxy-7,8,9,10-tetrahydro-4-(1-methylhexyloxy)-6,6,9-trimethyl-6H-dibenzo[b,d]pyran When equivalent amounts of 4-(1-methylhexyloxy)-resorcinol and 5-methyl-2-carbethoxycyclohexanone are condensed and the product is treated with methyl magnesium bromide and subsequently cyclized as described in Example 1, a mixture of the title compounds is obtained. The mixture is separated by dry column chromatography on silica.

EXAMPLE 16

3-Hydroxy-7,8,9,10-tetrahydro-1-(1-methylhexyloxy)-6,6,9-trimethyl-6H-dienzo[b,d]pyran Condensation of equivalent amounts of phloroglucinol and 5-methyl-2-carbethoxycyclohexanone according to the procedure described in Example 1 gives 1,3-dihydroxy-7,8,9,10-tetrahydro-9-methyl-6H-dibenzo[b,d]-pyrone.

To a stirred solution of 34.4 g. (0.1 mol.) of the dibenzo[b,d]pyrone and 5,6 g. (0.1 mol.) of potassium hydroxide in dimethylformamide is added 18.6 g. (0.104 mol.) of 2-bromoheptane. After heating the mixture for 16 hours at 100°, 25 ml. of acetic acid is added and the mixture is filtered. The filtrate is concentrated and the residue is dissolved in ether, washed with water and extracted with 10% aqueous sodium hydroxide. The alkaline solution is washed with ether, acidified with dilute hydrochloric acid and extracted with ether. The organic phase is dried (MgSO$_4$) and concentrated to give a mixture of 1-hydroxy-7,8,9,10-tetrahydro-3-(1-methylhexyloxy)-9-methyl-6H-dibenzo[b,d]pyrone and 3-hydroxy-7,8,9,10-tetrahydro-1-(1-methylhexyloxy)-9-methyl-6H-dibenzo[b,d]-pyrone which is separated by dry column chromatography on silica.

Treatment of 3-hydroxy-7,8,9,10-tetrahydro-1-(1-methylhexyloxy)-9-methyl-6H-dibenzo[b,d]pyrone with methyl magnesium bromide and subsequent cyclization according to the procedure described in Example 1 gives the title compound.

EXAMPLE 17

4-hydroxy-7,8,9,10-tetrahydro-3-(1-methylhexyloxy)-6,6,9-trimethyl-6H-dibenzo[b,d]pyran and 3-hydroxy-7,8,9,10-tetrahydro-4-(1-methylhexyloxy)-6,6,9-trimethyl-6H-dibenzo[b,d]pyran When equivalent amounts of 1,2,3-trihydroxybenzene and 5-methyl-2-carbethoxycyclohexanone are condensed as described in the procedure of Example 1,3,4-dihydroxy-7,8,9,10-tetrahydro-9-methyl-6H-dibenzo[b,d]-pyrone is obtained.

Alkylation of the dibenzo[b,d]pyrone with 2by the procedure described in Example 16 gives a mixture of 4-hydroxy-7,8,9,10-tetrahydro-3-(1-methylhexyloxy)-9-methyl-6H-dibenzo[b,d]pyrone and 3-hydroxy-7,8,9,10-tetrahydro-4-(1-methylhexyloxy)-9-methyl-6H-dibenzo[b,d]pyrone which is separated by dry column chromatography on silica.

Treatment of 4-hydroxy-7,8,9,10-tetrahydro-3-(1-methylhexyloxy)-9-methyl-6H-dibenzo[b,d]pyrone with methyl magnesium bromide and subsequent cyclization as described in Example 1 gives 4-hydroxy-7,8,9,10-tetrahydro-3-(1-methylhexyloxy)-6,6,9-trimethyl-6H-dibenzo[b,d]pyran.

Similarly, treatment of 3-hydroxy-7,8,9,10-tetrahydro-4-(1-methylhexyloxy)-9-methyl-6H-dibenzo[b,d]-pyrone with methyl magnesium bromide and subsequent cyclization gives 3-hydroxy-7,8,9,10-tetrahydro-4-(1-methylhexyloxy)-6,6,9-trimethyl-6H-dibenzo[b,d]pyran.

EXAMPLE 18

When an equivalent amount of catechol is substituted in the procedure of Example 1 for phloroglucinol, 2-(1-methylhexyloxy)phenol is obtained.

Substitution of an equivalent amount of 2(1-methylhexyloxy)phenol in the procedure of Example 2 for 3-(1-methylhexyloxy)phenol followed by treatment with methyl magnesium bromide and subsequent cyclization gives 7,8,9,10-tetrahydro-4-(1-methylhexyloxy)-6,6,9-trimethyl-6H-dibenzo[b,d]pyran.

Likewise, substitution of an equivalent amount of hydroquinone in the procedure of Example 1 for phloroglucinol gives 4-(1-methylhexyloxy)phenol.

Substitution of an equivalent amount of 4-(1-methylhexyloxy)phenol in the procedure of Example 2 for 3-(1-methylhexyloxy)phenol followed by treatment with methyl magnesium bromide and subsequent cyclization gives 7,8,9,10-tetrahydro-2-(1-methylhexyloxy)-6,6,9-trimethyl-6H-dibenzo[b,d]pyran.

EXAMPLE 19

When an equivalent amount of 2-bromo-3-methylheptane or 2-bromononane is reacted with 1,2,4trihydroxybenzene according to the procedure of Example 1, the following monoalkoxy-dihydroxybenzenes are obtained:

4-(1,2-dimethylhexyloxy)catechol
2-(1,2-dimethylhexyloxy)hydroquinone
4-(1,2-dimethylhexyloxy)resorcinol
4-(1-methyloctyloxy)catechol
2-(1-methyloctyloxy)hydroquinone
4-(1-methyloctyloxy)resorcinol.

Condensation of equivalent amounts of an alkoxydihydroxybenzene listed above and 5-methyl-2-carbethoxycyclohexanone followed by treatment with methyl magnesium bromide, subsequent cyclization according to the procedure of Example 1 and separation of the resulting mixtures by dry column chromatography gives the following dibenzo[b,d]-pyrans:

3-(1,2-dimethylhexyloxy)-2-hydroxy-7,8,9,10-tetrahydro-6,6,9-trimethyl-6H-dibenzo[b,d]pyran 1-(1,2-dimethylhexyloxy)-2-hydroxy-7,8,9,10-tetrahydro-6,6,9-trimethyl-6H-dibenzo[b,d]pyran 4-(1,2-dimethylhexyloxy)-2-hydroxy-7,8,9,10-tetrahydro-6,6,9-trimethyl-6H-dibenzo[b,d]pyran 2-(1,2-dimethylhexyloxy)-4-hydroxy-7,8,9,10-tetrahydro-6,6,9-trimethyl-6H-dibenzo[b,d]pyran 1-(1,2-dimethylhexyloxy)-4-hydroxy-7,8,9,10-tetrahydro-6,6,9-trimethyl-6H-dibenzo[b,d]pyran 2-(1,2-dimethylhexyloxy)-3-hydroxy-7,8,9,10-tetrahydro-6,6,9-trimethyl-6H-dibenzo[b,d]pyran 2-(1,2-dimethylhexyloxy)-1-hydroxy-7,8,9,10-tetrahydro-6,6,9-trimethyl-6H-dibenzo[b,d]pyran 4-(1,2-dimethylhexyloxy)-1-hydroxy-7,8,9,10-tetrahydro-6,6,9-trimethyl-6H-dibenzo[b,d]pyran 2-hydroxy-7,8,9,10-tetrahydro-3-(1-methyloctyloxy)-6,6,9-trimethyl-6H-dibenzo[b,d]pyran 2-hydroxy-7,8,99,10-tetrahydro-1-(1-methyloctyloxy)-6,6,9-trimethyl-6H-dibenzo[b,d]pyran 2-hydroxy-7,8,9,10-tetrahydro-4-(1-methyloctyloxy)-6,6,9-trimethyl-6H-dibenzo[b,d]pyran 4-hydroxy-7,8,9,10-tetrahydro-2-(1-methyloctyloxy)-6,6,9-trimethyl-6H-dibenzo[b,d]pyran 4-hydroxy-7,8,9,10-tetrahydro-1-(1-methyloctyloxy)-6,6,9-trimethyl-6H-dibenzo[b,d]pyran 3-hydroxy-7,8,9,10-tetrahydro-2-(1-methyloctyloxy)-6,6,9-trimethyl-6H-dienzo[b,d]pyran 1-hydroxy-7,8,9,10-tetrahydro-2-(1-methyloctyloxy)-6,6,9-trimethyl-6H-dibenzo[b,d]pyran 1-hydroxy-7,8,9,10-tetrahydro-4-(1-methyloctyloxy)-6,6,9-trimethyl-6H-dibenzo[b,d]pyran.

EXAMPLE 20

Substitution of an equivalent amount of 2-bromo-3-methylheptane in the procedure of Example 16 for 2-bromoheptane gives a mixture of 3-(1,2-dimethylhexloxy)-1-hydroxy-7,8,9,10-tetrahydro-9-methyl-6H-dibenzo[b,d]-pyrone and 1-(1,2-dimethylhexyloxy)-3-hydroxy-7,8,9,10-tetrahydro-9-methyl-6H-dibenzo[b,d]pyrone which is separated by dry column chromatography on silica. Treatment of 1-(1,2-dimethylhexyloxy)-3-hydroxy-7,8,9,10-tetrahydro-9-methyl-6H-dibenzo[b,d]pyran with methyl magnesium bromide and subsequent cyclization according to the procedure of Example 1 gives 1-(1,2-dimethylhexyloxy)-3-hydroxy-7,8,9,10-tetrahydro-6,6,9-trimethyl-6H-dibenzo[b,d]pyran.

In like manner 3-hydroxy-7,8,9,10-tetrahydro-1-(1-methyloctyloxy)-6,6,9-trimethyl-6H-dibenzo[b,d]pyran is prepared by substitution of an equivalent amount of 2-bromononane in the procedure of Example 16 for 2 bromoheptane, separation of the isomeric dibenzo[b,d]-pyrones and treatment of 3-hydroxy-7,8,9,10-tetrahydro-1-(1-methyloctyloxy)-9-methyl-6H-dibenzo[b,d]pyrone with methyl magnesium bromide and subsequent cyclization.

EXAMPLE 21

When an equivalent amount of 2-bromo-3-methylheptane is substituted in the procedure of Example 17 for 2-bromoheptane and the resulting dibenzo[b,d]pyrones are treated with methyl magnesium bromide and the products cyclized as described in Example 1, 3-(1,2-dimethylhexyloxy)-4-hydroxy-7,8,9,10-tetrahydro-6,6,9-trimethyl-6H-dibenzo[b,d]pyran and 4-(1,2-dimethylhexyloxy)-3-hydroxy-7,8,9,10-tetrahydro-6,6,9-trimethyl-6H-dibenzo[b,d]pyran are obtained.

Similarly, 4-hydroxy-7,8,9,10-tetrahydro-3-(1-methyloctyloxy)-6,6,9-trimethyl-6H-dibenzo[b,d]pyran and 3-hydroxy-7,8,9,10-tetrahydro-4-(1-methyloctyloxy)-6,6,9-trimethyl-6H-dibenzo[b,d]pyran are obtained by substitution of 2-bromononane into the procedure of Example 17 for 2-bromoheptane followed by treatment of the dibenzo[b,d]-pyrones with methyl magnesium bromide and subsequent cyclization.

EXAMPLE 22

When equivalent amounts of 4-methyl-2-carbethoxycyclohexanone and 5-(1-methylhexyloxy)resorcinol are condensed according to the procedure of Example 1 and the resulting dibenzo[b,d]pyrone is reacted with methyl magnesium bromide and the product cyclized, 1-hydroxy-7,8,9,10-tetrahydro-3-(1-methylhexyloxy)-6,6,8-trimethyl-6H-dibenzo[b,d]pyran is obtained.

In similar manner, 1-hydroxy-7,8,9,10-tetrahydro-3-(1-methylhexyloxy)-6,6,7-trimethyl-6H-dibenzo[b,d]pyran is obtained from 3-methyl-2-carbethoxycyclohexanone and 5-(1-methylhexyloxy)resorcinol.

Likewise, 1-hydroxy-7,8,9,10-tetrahydro-3-(1-methylhexyloxy)-6,6,10-trimethyl-6H-dibenzo[b,d]pyran is prepared from 6-methyl-2-carbethoxycyclohexanone and 5-(1-methylhexyloxy)resorcinol.

EXAMPLE 23

1-Hydroxy-7,8,9,10-tetrahydro-3-(1-methylhexyloxy)-6,6-dimethyl-6H-dibenzo[b,d]pyran Condensation of 5-(1-methylhexyloxy)resorcinol with an equivalent amount of 2-carbethoxycyclohexanone according to the procedure of Example 1 followed by reaction of the pyrone with methyl magnesium bromide and subsequent cyclization gives the title compound.

EXAMPLE 24

9-Ethyl-1-hydroxy-7,8,9,10-tetrahydro-3-(1-methylhexyloxy)-6,6-dimethyl-6H-dibenzo[b,d]pyran When an equivalent amount of 5-ethyl-2-carbethoxycyclohexanone is condensed with 5-(1-methylhexyloxy)-resorcinol according to the procedure of Example 1 and the resultant dibenzo[b,d]pyrone is treated with methyl magnesium bromide and the product cyclized, the title compound is obtained.

EXAMPLE 25

6,6-Diethyl-1-hydroxy-7,8,9,10-tetrahydro-3-(1-methylhexyloxy)-9-methyl-6H-dibenzo[b,d]pyran When 1-hydroxy-7,8,9,10-tetrahydro-3-(1-methylhexyloxy)-9-methyl-6H-dibenzo[b,d]pyrone is reacted with ethyl magnesium bromide according to the procedure described in Example 1, the title compound is obtained.

EXAMPLE 26

When equivalent amounts of 4-methyl-2-carbethoxycyclohexanone and an alkoxyresorcinol or alkoxyphenol listed below:
  5-(1,1,2-trimethylhexyloxy)resorcinol
  5-(1-ethyl-2-methylhexyloxy)resorcinol
  5-(1-methyloctyloxy)resorcinol
  3-(1-methylhexyloxy)phenol
are used as starting materials in the procedure described in Example 1, the following alkoxy-hydroxy or alkoxy-7,8,9,10-tetrahydro-6,6,8-trimethyl-6H-dibenzo[b,d]pyrans are obtained:
  1-hydroxy-7,8,9,10-tetrahydro-3-(1,1,2-trimethylhexyloxy)-6,6,8-trimethyl-6H-dibenzo[b,d]pyran
  3-(1-ethyl-2-methylhexyloxy)-1-hydroxy-7,8,9,10-tetrahydro-6,6,8-trimethyl-6H-dibenzo[b,d]pyran
  1-hydroxy-7,8,9,10-tetrahydro3-(1-methyloctyloxy)-6,6,8-trimethyl-6H-dibenzo[b,d]pyran
  7,8,9,10-tetrahydro-3-(1-methylhexyloxy)-6,6,8-trimethyl-6H-dibenzo[b,d]pyran.

In like manner, the corrsponding 6,6,7-trimethyl and 6,6,10-trimethyl-6H-dibenzo[b,d]pyrans are obtained from condensation of the above listed alkoxyresorcinols or alkoxyphenol and 3-methyl-2-carbethoxycyclohexanone and 6-methyl-2-carbethoxycyclohexanone, respectively.

EXAMPLE 27

When an equivalent amount of an alkoxyresorcinol or alkoxyphenol listed in Example 26 is substituted in the procedure of Example 23 for 5-(1-methylhexyloxy)-resorcinol, the following alkoxy or alkoxy-hydroxy-7,8,9,10-tetrahydro.-6,6-dimethyl-6H-dibenzo[b,d]pyrans are obtained:
  1-hydroxy-7,8,9,10-tetrahydro-6,6-dimethyl-3-(1,1,2-trimethylhexyloxy)-6H-dibenzo[b,d]pyran
  3-(1-ethyl-2-methylhexyloxy)-1-hydroxy-7,8,9,10-tetrahydro-6,6-dimethyl-6H-dibenzo[b,d]pyran
  1-hydroxy-7,8,9,10-tetrahydro-3-(1-methyloctyloxy)-6,6-dimethyl-6H-dienzo[b,d]pyran
  7,8,9,10-tetrahydro-3-(1-methylhexyloxy)-6,6-dimethyl-6H-dibenzo[b,d]pyran.

EXAMPLE 28

When an equivalent amount of an alkoxyresorcinol or alkoxyphenol listed in Example 26 is sustituted in the procedure of Example 24 for 5-(1-methylhexyloxy)-resorcinol, the following alkoxy or alkoxy-hydroxy-9-ethyl-7,8,9,10-tetrahydro-6,6-dimethyl-6H-dibenzo[b,d]pyrans are obtained:
  9-ethyl-1-hydroxy-7,8,9,10-tetrahydro-6,6-dimethyl-3-(1,1,2-trimethylhexyloxy)-6H-dibenzo[b,d]pyran
  9-ethyl-3-(1-ethyl-2-methylhexyloxy)-1-hydroxy-7,8,9,10-tetrahydro-6,6-dimethyl-6H-dibenzo[b,d]pyran
  9-ethyl-1-hydroxy-7,8,9,10-tetrahydro-3-(1-methyloctyloxy)-6,6-dimethyl-6H-dibenzo[b,d]pyran
  9-ethyl-7,8,9,10-tetrahydro--3-(1-methylhexyloxy)-6,6-dimethyl-6H-dibenzo[b,d]pyran.

EXAMPLE 29

When equivalent amounts of an alkoxyresorcinol or alkoxyphenol listed in Example 26 and 5-methyl-2-carbethoxycyclohexanone are condensed as described in Example 1 and the resulting alkoxy or alkoxy-hydroxy-7,8,9,10-tetrahydro-9methyl-6H-dibenzo[b,d]pyrones are treazted with ethyl magnesium bromide and subsquently cyclized, the following alkoxy or alkoxy-hydroxy-6,6-diethyl-7,8,9,10-terahydro-9-methyl-6H-dibenzo[b,d]pyrans are obtained:
  6,6-diethyl-1-hydroxy-7,8,9,10-tetrahydro-9-methyl-3-(1,1,2-trimethylhexyloxy)-6H-dibenzo[b,d]pyran
  3-(1-ethyl-2-methylhexyloxy)-6,6-diethyl-1-hydroxy-7,8,9,10-tetrahydro-9-methyl-6H-dienzo[b,d]pyran
  6,6-diethyl-1-hydroxy-7,8,9,10-tetrahydro-3-(1-metehyloctyloxy)-9-methyl-6H-dibenzo[b,d]pyran
  6,6-diethyl-7,8,9,10-tetrahydro-3-(1-methylhexyloxy)-9-methyl-6H-dibenzo[b,d]pyran.

EXAMPLE 30

Substitution of an equivalent amount of an alkoxy or alkoxy-hydroxy-7,8,9,10-tetrahydro-6,6,9-trimethyl-6H-dibenzo[b,d]pyran listed below:
  1-hydroxy-7,8,9,10-tetrahydro-3-(1,1,2-trimethylhexyloxy)-6,6,9-trimethyl-6H-dibenzo[b,d]pyran
  3-(1-ethyl-2-methylhexyloxy)-1-hydroxy-7,8,9,10-tetrahydro-6,6,9-trimethyl-6H-dibenzo[b,d]pyran
  1-hydroxy-7,8,9,10-tetrahydro-3-(1-methyloctyloxy)-6,6,9-trimethyl-6H-dibenzo[b,d]pyran
  7,8,9,10-tetrahydro-3-(1-methylhexyloxy)-6,6,9-trimethyl-6H-dibenzo[b,d]pyran
in the procedure of Example 11 for 1-hydroxy-7,8,9,10-tetrahydro-3-(1-methylhexyloxy)-6,6,9-trimethyl-6H-dibenzo[b,d]pyran gives the following aromatic dibenzo-[b,d]pyrans, respectively:
  1-hydroxy-3-(1,1,2-trimethylhexyloxy)-6,6,9-trimethyl-6H-dibenzo[b,d]pyran
  -trimethyl-3-(1-ethyl-2-methylhexyloxy)-1-hydroxy-6,6,9-trimethyl16H-dibenzo[b,d]pyran
  1-hydroxy-3-(1-methoxyloctyloxy)-6,6,9-trimethyl-6H-dibenzo[b,d]pyran
  3-(1-methylhexyloxy)-6,6,9-trimethyl-6H-dibenzo[b,d]pyran.

EXAMPLE 31

When an equivalent amount of an alkoxy or alkoxy-hydroxy-7,8,9,10-tetrahydro-6,6,9-trimethyl-6H-dibenzo[b,d]pyran listed in Example 30 is substituted in the procedure of Example 12 for 1-hydroxy-7,8,9,10-tetrahydro-3-(1-methylhexyloxy)-6,6,9-trimethyl-6H-dibenzo[b,d]pyran, the following akoxy or alkoxy-hydroxy-6a, 7,8,9,10,10a-hexahydro-6,6,9-trimethyl-6H-dibenzo[b,d]pyrans are obtained:
  1-hydroxy-6a,7,8,9,10,10a-hexahydro-3-(1,1,2-trimethylhexyloxy)-6,6,9-trimethyl-6H-dibenzo[b,d]pyran
  3-(1-ethyl-2-methylhexyloxy)-1-hydroxy-6a,7,8,9,10,10a-hexahydro-6,6,9-trimethyl-6H-dibenzo[b,d]pyran
  1-hydroxy-6a,7,8,9,10,10a-hexahydro-3-(1-methyloctyloxy)-6,6,9-trimethyl-6H-dibenzo[b,d]pyran
  6a,7,8,9,10,10a-hexahydro-3-(1-methylhexyloxy)-6,6,9-trimethyl-6H-dibenzo[b,d]pyran.

EXAMPLE 32

1-Acetoxy-7,8,9,10-tetrahydro-3-(1-methylhexyloxy)-6,6,9-trimethyl-6H-dibenzo[b,d]pyran A solution of 1.0 g. of 1-hydroxy-7,8,9,10-tetrahydro-3-(1-methylhexyloxy)-6,6,9-trimethyl-6H-dibenzo[b,d]pyran in 20 ml. of acetic anhydride containing 0.5 g. of sodium acetate is refluxed for 5 hours. The excess anhydride is evaporated in vacuo and the residue is dissolved in water and extracted with ether. The extract is washed with water until neutral, then dried and evaporated to give an oil which is chromatographed on a silica gel dry-column. Concentration of the eluent and distillation of the residue in vacuo give the title compound.

EXAMPLE 33

By the procedure of Example 32, using propionic anhydride in place of acetic anhydride, the product is 7,8,9,10-tetrahydro-3-(1-methylhexyloxy)-6,6,9-trimethyl-1-propionyloxy-6H-dibenzo[b,d]pyran.

Similarly, using n-butyric anhydride, the product is 1-n-butyryloxy-7,8,9,10-tetrahydro-3-(1-methylhexyloxy)-6,6,9-trimethyl-6H-dibenzo[b,d]pyran.

By the same procedure, using n-valeric anhydride, the product is 7,8,9,10-tetrahydro-3-(1-methylhexyloxy)-6,6,9-trimethyl-1-n-valeryloxy-6H-dibenzo[b,d]pyran.

EXAMPLE 34

When an alkoxy-hydroxy-7,8,9,10-tetrahydro-6,6,9-trimethyl-6H-dibenzo[b,d]pyran listed in Example 30 is substituted in the procedure of Example 32 for 1-hydroxy-7,8,9,10-tetrahydro-3-(1-methylhexyloxy)-6,6,9-trimethyl-6H-dibenzo[b,d]pyran, the corresponding acetoxy derivatives listed below are obtained:

1-acetoxy-7,8,9,10-tetrahydro-3-(1,1,2-trimethylhexyloxy)-6,6,9-trimethyl-6H-dibenzo[b,d]pyran 1-acetoxy-3-(1-ethoxy-2-methylhexyloxy)-7,8,9,10-tetrahydro-6,6,9-trimethyl-6H-dibenzo[b,d]pyran 1-acetoxy-7,8,9,10-tetrahydro-3-(1-methyloctyloxy)-6,6,9-trimethyl-6H-dibenzo[b,d]pyran.

Similarly, the 1-propionyloxy, 1-n-butyryloxy and 1-n-valeryloxy-3-alkoxy-7,8,9,10-tetrahydro-6,6,9-trimethyl-6H-dibenzo[b,d]pyrans may be obtained.

What is claimed is:

1. A compound of the formula:

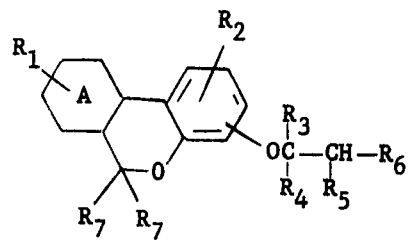

in which:

ring A is a benzene ring, a cyclohexane ring or a cyclohexane ring with the double bond being at position 6a-10a, 8 or 9;

$R_1$ is hydrogen, methyl or ethyl;

$R_2$ is hydrogen or $OR'$ where $R'$ is hydrogen or alkanoyl of from two to five carbon atoms;

$R_3$ is hydrogen, methyl or ethyl and $R_4$ and $R_5$ are hydrogen or methyl, at least one of $R_3$, $R_4$ and $R_5$ being other than hydrogen;

$R_6$ is alkyl of from four to eight carbon atoms; and $R_7$ is methyl or ethyl.

2. A compound of claim 1 where $R_2$ is in the 1-position and

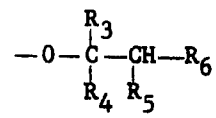

is in the 3-position.

3. A compound of claim 2 where ring A is a cyclohexene ring with the double bond at position 6a-10a, $R_3$ is methyl and $R_4$ and $R_5$ are hydrogen or methyl.

4. A compound of claim 3 where $R_1$ is methyl in the 9-position, $R_2$ is hydroxy or acetoxy, $R_4$ and $R_5$ are hydrogen, $R_6$ is n-butyl and $R_7$ is methyl.

5. A compound of claim 4 being the compound 1-hydroxy-7,8,9,10-tetrahydro-3-(1-methylhexyloxy)-6,6,9-trimethyl-6H-dibenzo[b,d]pyran.

* * * * *

PO-1050
(5/69)

UNITED STATES PATENT OFFICE
CERTIFICATE OF CORRECTION

Patent No. 3,856,821          Dated December 24, 1974

Inventor(s) Bernard Loev

It is certified that error appears in the above-identified patent and that said Letters Patent are hereby corrected as shown below:

Column 7, line 20, "500" should read -- 500 ml. -- .

Column 10, line 5, "2by" should read -- 2-bromoheptane by --.

Column 11, line 18, "7,8,99,10" should read -- 7,8,9,10 -- .

Column 14, line 14, "metehyloctyloxy)" should read -- methyloctyloxy) -- .

Column 14, line 39, delete "-trimethyl-".

Column 14, line 40, "trimethyl16H" should read -- trimethyl-6H -- .

Column 14, line 53, "akoxy" should read -- alkoxy -- .

Column 15, line 41, "1-ethoxy" should read -- 1-ethyl -- .

Column 16, line 17, "clohexane" should read -- clohexene -- .

Signed and sealed this 1st day of April 1975.

(SEAL)
Attest:

RUTH C. MASON
Attesting Officer

C. MARSHALL DANN
Commissioner of Patents
and Trademarks